Patented June 5, 1928.

1,672,705

UNITED STATES PATENT OFFICE.

LAWRENCE BRADSHAW, OF BAINBRIDGE, NEW YORK.

SIZED CELLULOSE-FIBER PRODUCT AND PROCESS OF MAKING.

No Drawing.  Application filed July 28, 1927. Serial No. 209,178.

This invention has for its object the production of a comparatively cheap sizing material for use in cellulose materials, especially in paper and wood fiber products. It may also be utilized in the sizing of mineral matter such as clay for attaching it to paper; for the fastening of colors on to wall-papers; and for the sizing of cloth, with or without the addition of a filler. For producing this size I employ preferably a composite base containing casein and a finely ground peanut meal, from which all or practically all of the oil has been removed, mixed with such substances as will give a fairly good solution of the peanut meal and a satisfactory flow to the sizing made from such product.

It is known that the protein substance obtained from seedmeals by extraction with alkalies or other solvents, filtration from the insoluble constituents of the meal, reprecipitation, washing and drying, has been utilized for the preparation of a sizing material. The protein obtained in this way, however, is expensive owing to the difficulties of removing the suspended insoluble matter and recovering the precipitated protein, low yields arising from imperfect separation and the partial decomposition of the protein substances during the process, perhaps brought about by hydrolysis. No claim is made to the use of proteids so separated from seed meal, but only to the use of the "seed-meal" itself (after the partial or complete removal of oil therefrom), and the term "seed-meal" is to be construed accordingly.

I have now found that when peanut meal, substantially free from oil, is ground to extreme fineness say at least 200 mesh, and preferably about 220 to 300 mesh, and dissolved (or more properly stated, partly dissolved and partly suspended) in water, with the aid of a suitable alkaline-reacting substance capable of dissolving the protein present in the said meal, the resulting size is fairly satisfactory for the sizing of cellulose materials, for the fastening of clay or other coating substances to paper, and for similar purposes. I have found, however, that the flowing quality of sizes prepared from peanut meal alone is not as satisfactory as might be desired in certain cases; for example, when the size is mixed with clay and applied to paper, there is a tendency for the sheet to show streaks and other unevenness after drying. I have further discovered that this tendency is largely overcome, and the flowing or spreading property of the size is improved in a very marked degree by the addition to the peanut meal (before or after mixing with alkali) of a portion of casein or animal glue or substance of like nature. The amount of casein may vary from 10 to 75%, and in practice about 20 to 30% gives good results on book paper and about 50 to 60% on a heavy coated paper, such as lithograph paper.

For the making of sizing compositions for white or light-colored papers I preferably take the press-cake remaining after expressing the oil from peanut cotyledons from which the red skins have been previously removed, or this material after further reduction of the oil-content by extraction with naphtha or other suitable volatile solvent. Where the compositions are intended for use on dark paper, etc., or in admixture with dark pigments, the removal of the skins is unnecessary. This material, crushed to a fine powder, constitutes the product referred to herein as "peanut meal". It is ground to at least 200 mesh, preferably to 250 mesh or finer.

The effect of adding casein to peanut meal in the preparation of a size is to impart a better flowing capacity and superior working properties in the mechanical application of the size, and to increase the adhesive strength.

Various pigments and coating substances such as clay, satin white, etc., can be used with this composite size.

The casein and the peanut meal material are dissolved in any of the solvents commonly used in making sizing or coating compositions from casein, such as an aqueous solution of the alkaline-reacting compounds of the alkali metals, or ammonia.

Examples are given below, of combinations which I have found to give satisfactory results; and the methods of using them in certain of the arts. The parts are by weight.

*Example 1.*—50 parts of peanut meal ground to about 220 mesh, 50 parts of comminuted dry casein, 10 parts of borax, 5 parts of tri-sodium phosphate. The dry materials are thoroughly blended together in a suitable mixing apparatus and are then ready to ship. To prepare for use, 100 parts by weight of the mixture are added to about 400 parts by weight of cold water, stirred thoroughly to remove all lumps, and preferably heated to 160° Fahr., to hasten the dissolving action. The size may thereafter be used either hot or cold.

For use in engine sizing, the size is added to the pulp in a beating-engine, preferably just before the addition of the rosin size commonly employed, or it may be added in admixture with the rosin size. Thereafter, the usual procedure is followed, viz., the mixture is agitated in the beater for a certain length of time and alum may be added to precipitate the rosin size. The peanut-meal size is also partially precipitated on the paper fiber by the neutralizing action of the added alum but, since the precipitation is incomplete, the loss in the residual water from the pulp may be somewhat greater than that from casein sizes under similar conditions.

For the sizing of writing paper, the size prepared as in this example is preferably diluted with 400 parts or more, of water. The diluted size is then placed in the ordinary tub sizing box and after running the paper through the bath, the excess liquid is squeezed out by the usual means and the paper is dried.

*Example 2.*—80 parts of peanut meal as described above, 20 parts of casein of ordinary commercial quality ground, say to 24 mesh, 15 parts of borax. Treat as in Example 1.

*Example 3.*—70 parts of peanut meal as described in Example 1, 30 parts of casein, 10 parts of borax, 10 parts of tri-sodium phosphate. Treat as in Example 1.

*Example 4.*—75 parts of dry powdered casein, 25 parts of peanut meal, 10 parts borax, 10 parts tri-sodium phosphate. Treat as in Example 1.

*Example 5.*—80 parts peanut meal as described in Example 1, 10 parts of pulverized animal glue, 10 parts of borax. Treat as in Example 1.

For use in the coating of paper the wet size, made as described in the foregoing examples, is added to an aqueous suspension of clay, or a mixture of clay with satin white, blanc fixe or the like (prepared by the usual methods well known in the art, and containing about 50% of water) in the proportion of 50 to 125 parts by weight (corresponding to about 10 to 25 parts of the dry size) to 100 parts of the dry clay or mineral matter. The mixture is then thoroughly stirred, diluted with water to the required consistency, strained and applied in the usual way known in the art of paper-coating.

In the production of shade-cloth, book-cloth and the like, flour paste may be used with the peanut meal and casein or animal glue to regulate the consistency and improve the spreading capacity of the size. Thus the following method may be used with satisfactory results: 500 pounds of the wet sizing from the examples cited above (containing about 100 pounds of the dry size) are mixed with 200 pounds of clay suspended in 200 pounds of water. To this is added a paste consisting of 150 pounds of flour (say common wheat flour), in 200 pounds of water, heated to 160° F. to rupture the starch cells. 75 pounds (about ten gallons) of linseed oil and any required coloring pigment or dye are then stirred into the mass and the whole subjected to vigorous stirring or kneading to produce a uniform compounding of the various ingredients; the heavy mixture is then ready to be applied by the methods well known in the art.

It will be evident that the size herein described may also be used with advantage for other purposes, such as the finishing of cloth, the production of oil cloth, etc.

In cases where a water-resistant coating is required, suitable waterproofing agents may be added to the sizes. For instance, in paper-coating, the addition to the finished mixture, of ¼ ounce of formaldehyde for every 1 pound of dry sizing material produces a coating which becomes insoluble upon thorough seasoning.

The term "animal glue base" as used herein, is intended to cover casein and animal glue, the latter including fish-glue, hide-glue, bone-glue and the like. Of the substances mentioned, I have found that casein is superior for use with the compositions herein described.

I claim:

1. A cellulose fiber material treated with a size which includes peanut meal and casein.

2. A cellulose fiber material treated with a size containing peanut meal and an animal-glue base.

3. A process of making a sized cellulose fiber product which comprises treating a cellulose fiber material with a size which has as a base peanut meal and casein.

4. A process of making a sized cellulose fiber product which comprises treating a cellulose fiber material with a size which has as a base peanut meal and casein, and contains also flour, oil or pigment.

5. A sizing-composition comprising a substantially homogeneous mixture of casein and very finely divided peanut meal (all of which will pass through a 200 mesh screen) and an aqueous solution of an alkaline-reacting material in amount at least sufficient to dissolve the proteids thereof, such composition being of a smooth appearance and capable of being spread readily.

6. A sizing-composition comprising a coating pigment and a substantially homogeneous mixture of casein and very finely divided peanut meal (all of which will pass through a 200 mesh screen) together with an aqueous solution of an alkaline-reacting material in amount at least sufficient to dissolve the proteids thereof, such sizing-composition being of a smooth appearance and capable of being spread readily.

In testimony whereof I affix my signature.

LAWRENCE BRADSHAW.